United States Patent [19]
Kavehrad et al.

[11] Patent Number: 5,469,277
[45] Date of Patent: Nov. 21, 1995

[54] OPTICAL INTERCONNECTION DEVICE

[75] Inventors: Mohsen Kavehrad, Cumberland; Gang Yun, Ottawa, both of Canada

[73] Assignee: University of Ottawa, Ottawa, Canada

[21] Appl. No.: 832,385

[22] Filed: Feb. 7, 1992

[51] Int. Cl.[6] .............................. G03H 1/00; H04J 14/00; G02B 6/26
[52] U.S. Cl. .............................. 359/15; 359/34; 359/130; 385/17; 385/31; 385/37; 385/46
[58] Field of Search .................. 385/10, 17, 31, 385/37, 39, 46, 50, 33, 34; 359/109, 174, 178, 179, 117, 558, 566, 15, 10, 21, 22, 24, 34, 127, 128, 129, 130, 138

[56] References Cited

U.S. PATENT DOCUMENTS

| | | | |
|---|---|---|---|
| 3,553,460 | 1/1971 | Preston, Jr. | 359/22 |
| 4,057,319 | 11/1977 | Ash et al. | 359/34 |
| 4,111,524 | 9/1978 | Tomlinson, III | 385/37 |
| 4,198,117 | 4/1980 | Kobayashi | 359/127 |
| 4,257,673 | 3/1981 | Matthijsse | 385/37 |
| 4,432,600 | 2/1984 | Falco | 359/34 |
| 4,474,424 | 10/1984 | Wagner | 359/127 |
| 4,834,485 | 5/1989 | Lee | 359/34 |
| 4,907,851 | 3/1990 | Marhic | 385/24 |
| 4,923,271 | 5/1990 | Henry et al. | 359/130 |
| 4,952,010 | 8/1990 | Healey et al. | 359/1 |
| 5,002,350 | 3/1991 | Dragone | 359/130 |
| 5,016,966 | 5/1991 | Bowen et al. | 359/34 |
| 5,078,468 | 1/1992 | Stone | 385/116 |
| 5,121,231 | 6/1992 | Jenkins et al. | 359/10 |
| 5,255,332 | 10/1993 | Welch et al. | 385/17 |

FOREIGN PATENT DOCUMENTS

| | | |
|---|---|---|
| 0213726 | 7/1986 | European Pat. Off. .......... G02B 5/32 |
| 3118582A1 | 12/1982 | Germany . |
| PCT/CA91/00113 | 10/1991 | WIPO . |

OTHER PUBLICATIONS

"*Theory of an efficient of NxN passive star coupler*"; M. Tabiani and M. Kavehrad, Journal of Lightwave Technology, vol. LT–9, No. 4, pp. 448–455, Apr. 1991.

Primary Examiner—Loha Ben
Assistant Examiner—John Juba, Jr.
Attorney, Agent, or Firm—Thomas Adams

[57] ABSTRACT

In N×N optical couplers, such as are used in local area networks and backplanes of telecommunications and computer equipment, which use BRAGG volume diffraction means to couple light beams between the inputs and outputs, the number of gratings is reduced by means of so-called "grating degeneration" one grating can be shared by at least two wave pairs at the same time. In order to achieve this reduction, the directions of light waves in the dielectric slab (or the lateral positions of fibre ends) are suitable arranged. In other embodiments, a reduced number of gratings is achieved by using a "sandwiched" structure which uses multi-layered dielectric slabs. Both embodiments may be combined in the one coupler.

23 Claims, 7 Drawing Sheets

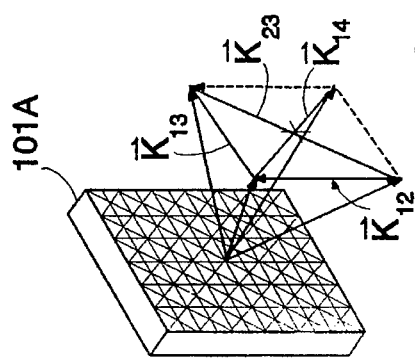
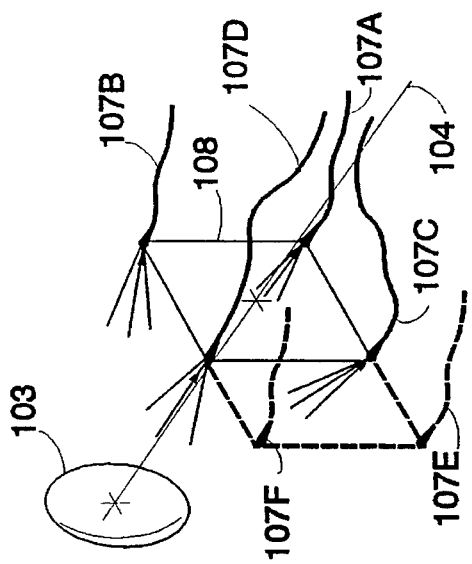
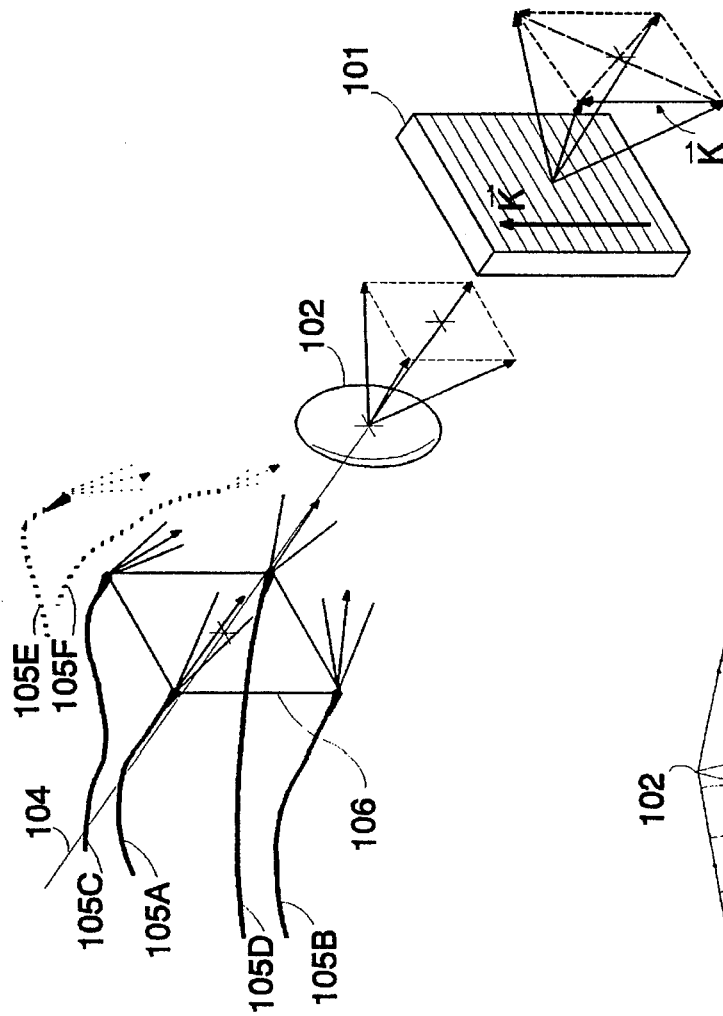
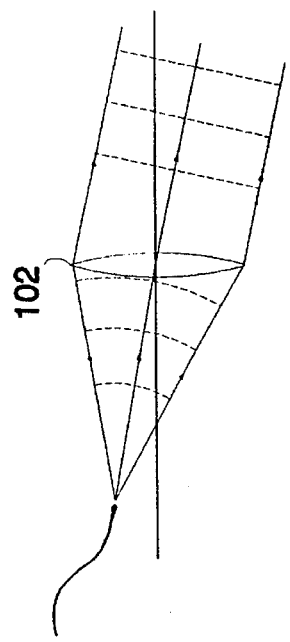
FIG. 1A
FIG. 1
FIG. 2

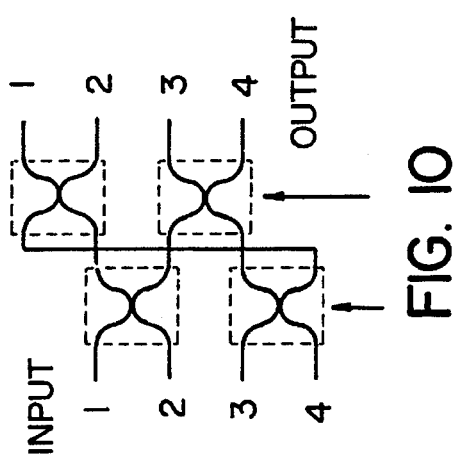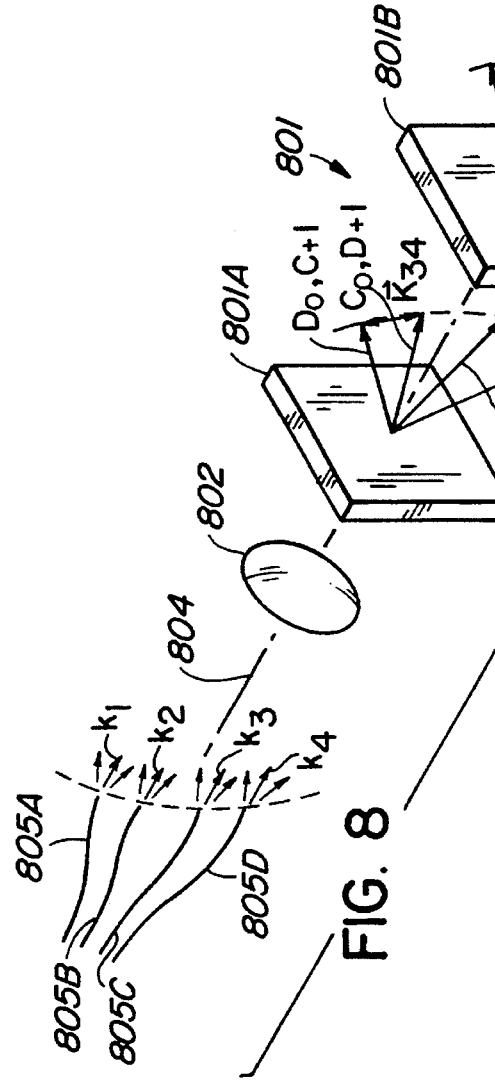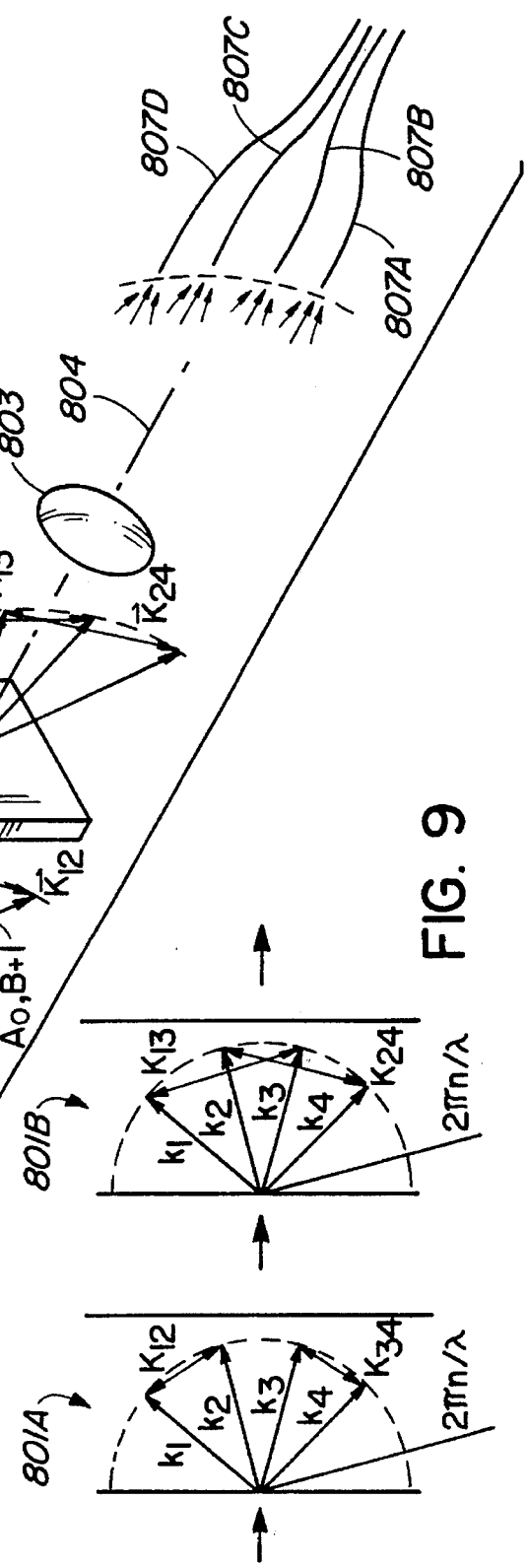

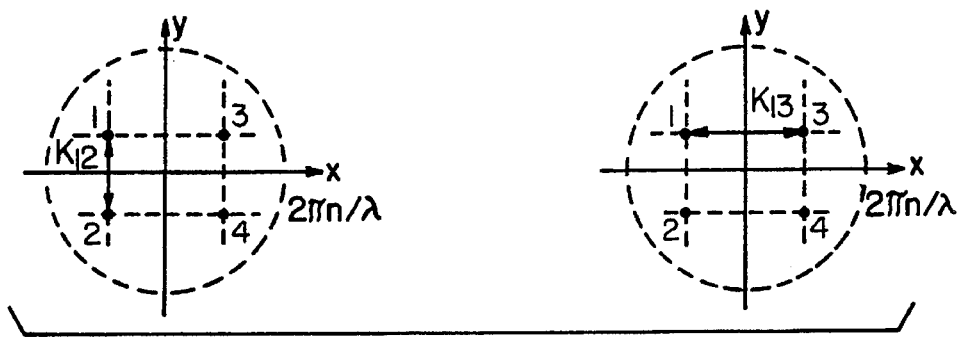
FIG. 12A
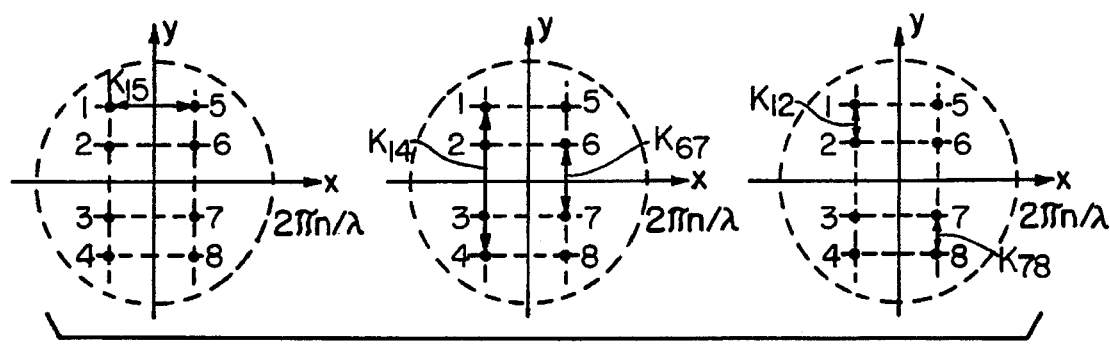
FIG. 12B
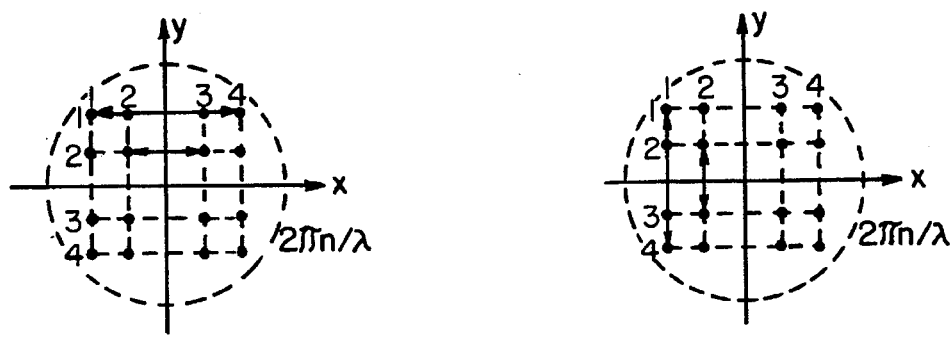
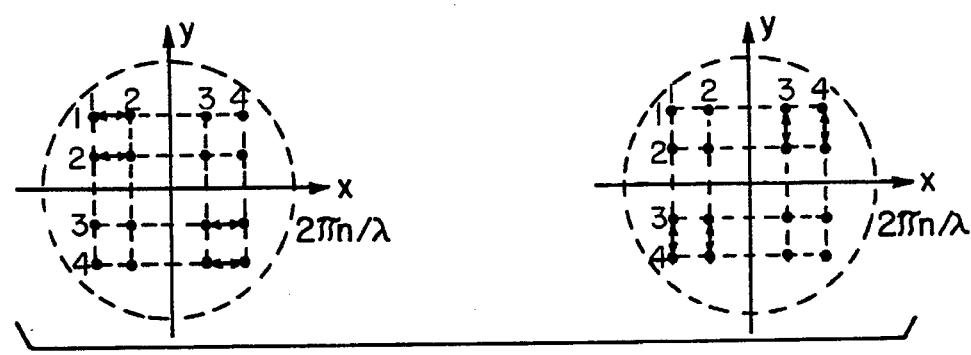
FIG. 12C

OPTICAL INTERCONNECTION DEVICE

FIELD OF INVENTION

The invention relates to optical interconnection devices and is especially, but not exclusively, applicable to N×N interconnectors or couplers such as are used in local area networks and backplanes of telecommunications and computer equipment.

BACKGROUND

An optical interconnection device disclosed in a paper by M. Tabiani and M. Kavehrad entitled "Theory of an efficient N×N passive star coupler", Journal of Lightwave Technology, Vol. LT-9, No.4, pp. 448–455, April 1991, and in International patent application No. PCT/CA 91/00113, both of which are incorporated herein by reference, and U.S. patent application Ser. No. 594,137, now U.S. Pat. No. 5,179,605, which is incorporated by reference and appended hereto, comprises a stratified volume BRAGG diffraction means with a spatially varying refractive index. The volume diffraction means comprises gratings which are three-dimensional periodic structures which couple planar light waves from N input fibers to N' output fibers, the prime signifying that the number of output fibers could be different from the number of input fibers. The gratings may be provided using holographic techniques.

In the coupler disclosed in PCT/CA 91/00113, the refractive index of the diffraction means varies spatially according to the expression:

$$n(x, z) = 1 + \sum_{m} \sum_{m'} \Delta_{m,m'} \sin(\vec{k}^*_{m,m'} \cdot \vec{r})$$

where x and z are two of the three spatial ordinates of the grating medium;

$\vec{k}_{m,m'}$ is the spatial frequency vector;

m is an input position or mode, corresponding to one optical axis;

m' is an output position or mode, corresponding to one optical axis;

m and m' take integer values that determine the number of input/output modes;

$\Delta_{m,m'}$ is the modulation index which determines the coefficient of coupling between m and m';

$\vec{r}$ is the space vector (x,y,z). (Neglecting y gives a two-dimensional arrangement.)

Diffraction theory shows that, when $N' \geq N$, such configurations can potentially achieve substantially 100 per cent efficiency. In such a coupler, when N=N', the number of different gratings in the diffraction means is $\frac{1}{2}(N^2-N)$. This number increases approximately with the square of the number of inputs N. Thus, while a 3×3 coupler requires 3 gratings, a 10×10 coupler requires 45 gratings. The dynamic range of the refractive index of the slab, however, can be shown to increase with $N^{3/2}$. For a practical holographic recording material, for example Dichromated Gelatin (DCG), which has a dynamic range less than 0.1, the dynamic range of the recording material will set a limit on the number of users or inputs N. The problem is compounded by the fact that high dynamic range (high modulation index) and low noise are usually conflicting requirements.

An object of the present invention is to mitigate this problem and provide an improved optical interconnection device.

SUMMARY OF INVENTION

The invention seeks to reduce the number of gratings by arranging for one grating to couple at least two sets of sources with two sets of receivers, the sets being displaced relative to each other, and/or by providing two diffraction means in tandem i.e. sandwiched, so that, between them, they provide the required number of couplings or interconnections.

According to one aspect of the present invention, an optical interconnection device comprises diffraction means comprising at least one volume diffraction grating having a spatially varying refractive index, input means for directing input light beams onto said diffraction means, and output means for receiving output light beams leaving said diffraction means. The input means comprises a first set of at least two sources spaced apart in a first direction to direct a first set of light beams, preferably in a first input plane, and a second set of at least two sources spaced apart in a direction parallel to said first direction to direct a second set of light beams, preferably in a second input plane. The second set of sources preferably are displaced from the first set of sources laterally of said first direction so that the first and second sets of light beams converge towards the diffraction means. The output means comprises correspondingly arranged first and second sets of receivers to receive respective output light beams, the spatially varying refractive index and the respective positions of the sources and receivers being such that the same grating couples both sets of sources with their corresponding receivers.

With such an arrangement, each of said receivers can receive parts of input light beams from all of a corresponding set of sources.

In this specification, "sources" embraces ports, ends of optical fibers or other waveguides, laser diodes and like means for emitting light. "Receivers" embraces ports, ends of optical fibers or other waveguides, photodiodes and like means for receiving light.

The diffraction means may be arranged so that one of said parts of the input light beam is not diffracted, i.e. corresponds to the zero order. This may be achieved by varying the thickness and/or modulation depth of the grating.

Such a coupler is predicated upon the realisation that one grating can be used to couple two sets of light beams impinging upon it from different directions to emerge at correspondingly different output directions, providing that the corresponding input means and output means are suitably positioned and oriented according to Bragg conditions. Advantageously, the same grating may be used for coupling additional sets of light beams, providing that each additional set are in a different plane and also satisfy the Bragg condition.

With such an arrangement, a 4×4 star coupler can be made with four different gratings compared to the six different gratings required by the coupler disclosed in PCT/CA 91/00113.

According to a second aspect of the invention, an optical interconnection device, for coupling a plurality of sources with a plurality of receivers, comprises at least first and second volume diffraction means, each comprising at least one volume diffraction grating, the first volume diffraction grating means being arranged to provide a predetermined diffraction of input light beams and the second volume diffraction means being arranged to provide a predetermined diffraction of the diffracted input light beams, the arrangement being such that coupling of all of said sources with all of said receivers is provided for light beams passing through both of said two volume diffraction means.

The first and second aspects of the invention may be embodied in a single optical interconnector. Such an interconnector would then comprise at least first and second tandem diffraction means, a plurality of sources for directing input light beams onto the first diffraction means, and a plurality of receivers for receiving output light beams leaving said second diffraction means. The first and second diffraction means would each comprise at least one volume diffraction grating, the first diffraction means being arranged to provide a predetermined diffraction of input light beams, and the second diffraction means being arranged to provide a predetermined diffraction of the diffracted light beams, such that coupling of all of said sources means with all of said output means is provided for light beams passing through both of said two volume diffraction means. The plurality of sources comprises a first set spaced apart in a first direction and a second set of sources spaced apart in the same direction but laterally offset relative to the first set. The plurality of receivers comprises first and second sets of receivers correspondingly arrayed for receiving output light beams. The first volume diffraction means and said second volume diffraction means each have a refractive index varying spatially such that each receiver can receive light beams from each of a corresponding set of sources.

According to a third aspect of the invention, a diffraction means, for use with an optical interconnection device according to either the first aspect or the second aspect, comprises at least one volume diffraction grating having its refractive index n varying spatially according to the expression:

$$n(\vec{r}) = n_0 \left[ 1 + \sum_{i=1}^{M} \Delta_i \cos(\vec{K_i} \cdot \vec{r}) \right]$$

where $n_0$ is the average refractive index $\vec{r}=(x,y,z)$ and $\vec{K}=(K_x, K_y, K_z)$.

Thus, if only one grating is provided, its refractive index will vary according to the expression:

$$n(\vec{r})=n_0[1+\cos(\Delta(\vec{K_i}\cdot\vec{r}))]$$

If two gratings are provided, the refractive index of the combination will vary according to the expression:

$$n(\vec{r})=n_0[1+\Delta_1\cos(\vec{K_1}\cdot\vec{r})+\Delta_2\cos(\vec{K_2}\cdot\vec{r})]$$

According to another aspect of the invention, an optical interconnection device for interconnecting point sources, for example laser diodes, ends of optical fibres or other optical waveguides, and the like, with point receivers, for example photodiodes, ends of optical fibers or other optical waveguides and the like, comprises diffraction means comprising at least one volume diffraction grating having a spatially varying refractive index, input means comprising first lens means for collimating spherical light beams from said point sources before incidence upon the diffraction means and the output means comprising second lens means for converting said planar output light beams leaving said diffraction means to spherical light beams for reception by said point receivers.

According to a further aspect of the invention, apparatus for making a volume diffraction means comprises means for supporting a body of photorefractive material relative to a plurality of light sources and repeatedly exposing the material to light beams from said sources, and means for recording a resulting interference pattern, the sources being arranged and operable to emit said light beams from different positions in two dimensions transversely to the direction of propagation of light therefrom and an axis extending through said body.

The light sources may comprise two sources which are movable relative to each other between exposures.

Alternatively, the light sources may comprise a fixed array of sources selectively operable, in pairs, to irradiate the material, different pairs being operable to give the required interference patterns.

The sources may emit spherical light waves and the apparatus further comprise lens means disposed between the sources and the body for converting the light waves to planar waves.

The foregoing and other objects, features, aspects and advantages of the present invention will become more apparent from the following detailed description, in conjunction with the accompanying drawings, of preferred embodiments of the invention.

BRIEF DESCRIPTION OF DRAWINGS

FIG. 1 is a schematic view of an optical interconnector or coupler embodying a first aspect of the invention;

FIG. 1A is a detail showing a volume diffraction means for a 4×4 coupler;

FIG. 2 illustrates lens action to convert spherical waves to plane waves;

FIG. 8 is a schematic diagram of an interconnection device embodying a second aspect of the invention in which two diffraction means are used in tandem;

FIG. 9 is a vector diagram for the interconnection device of FIG. 8;

FIG. 10 illustrates the logical connection of the interconnection device of FIG. 8;

FIGS. 12A, 12B and 12C are tip vector diagrams for, respectively, 4×4, 8×8 and 16×16 star couplers embodying the invention;

Figure 3:
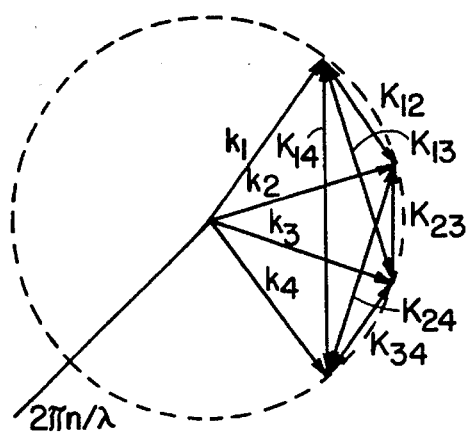
FIG. 3 is a vector diagram representing the six possible coupling combinations of a 4×4 star coupler.

DESCRIPTION OF PREFERRED
EMBODIMENTS

Referring to FIG. 1, an optical interconnection device comprises a diffraction means 101, comprising a volume diffraction grating, disposed between a pair of convex lenses 102 and 103, respectively, with a common optical axis 104. The volume diffraction means 101 is formed from a dielectric material permitting holographic recording, such as Dichromated Gelatin (DCG). Formation of the volume diffraction grating will be described later. A rectangular array of optical fibers 105A, 105B, 105C and 105D are mounted with their respective ends in a plane 106 extending substantially perpendicular to the common optical axis 104. The optical fibres serve as point sources to direct light beams onto diffraction means 101 by way of lens 102. A similar array of optical fibers 107A, 107B, 107C and 107D are mounted with their respective ends in a plane 108 and serve as receivers to receive output light beams from lens 103.

The lenses 102 and 103 allow planar gratings to be used and recorded at a wavelength (for example 0.5145 μm from a Ar⁺ laser) different from the working wavelength of the coupler, typically 1.3 μm. Hence, as illustrated in FIG. 2, each of the light beams from fibers 105A to 105D will be collimated by the lens 102 to produce a plane wave incident upon the volume grating 101. On leaving the volume grating 101, the plane output light beams are focused by the lens 103 to spherical light beams directed to the optical fibers 107A to 107D. Input optical fibres 105A to 105D comprise first and second sets. Light beams from the first set, comprising optical fibres 105A and 105B will transmit in a first plane 501 (see FIG. 5) which is shown vertical. Light beams from the second set, comprising optical fibres 105C and 105D, will transmit in a second plane 502 (see FIG. 5), also shown vertical. Following diffraction, light beams from optical fibres 105A and 105B will be received by optical fibres 107A and 107B, which comprise a first output set.

Each of the fibers 107A to 107D will receive output light beams comprising parts of light beams emanating from two of the input fibers.

Thus the volume grating 101 couples the light beams "vertically" in sets. In particular, the arrangement is such that each output fiber receives the zero order of one of the pair of input fibers and a higher order, typically the first, from the other. This may be achieved by varying the thickness and/or modulation depth of the grating.

Such positioning of the input and output fibers means that a single grating can be used for more than one set of input/output lightbeams, so fewer individual gratings are required to give all coupling combinations. This reduction in the number of gratings will be referred to as "grating degeneration".

It should be noted that the interconnection device of FIG. 1 is not a 4×4 coupler but rather two 2×2 couplers side-by-side. FIG. 1A illustrates a diffraction means 101A which, substituted for the diffraction means 101 of FIG. 1, will convert the interconnection device into a 4×4 coupler. The diffraction means 101A comprises four different gratings, $K_{12}$, $K_{13}$, $K_{14}$ and $K_{23}$, superimposed. Gratings $K_{12}$ and $K_{13}$ are "degenerated" in that they couple two sets of sources with their respective sets of receivers, i.e. they provide the coupling which would have required gratings $K_{24}$ and $K_{34}$, which are omitted.

In order to explain the nature of a "degenerated" volume diffraction means, the theory governing operation of a 2×2 coupler will first be developed. In this case, the complex envelope of the light field in a volume diffraction means with a single wavelength can be represented as $$E(\vec{r}) = C_1 e^{j\vec{k}_1 \cdot \vec{r}} + C_2 e^{j\vec{k}_2 \cdot \vec{r}} \qquad (1)$$

where $$\begin{cases} \vec{k}_i = (k_{ix}, k_{iy}, k_{iz}) = i = 1, 2 \\ \vec{r} = (x, y, z) \end{cases}$$

$C_1$ and $C_2$ are constants representing initial phase and amplitude; and vector $\vec{k}_i (i=1,2)$ is the wave vector of one of the two plane waves. This two-wave assumption is true if the thickness of the grating is so large that all the unwanted high order diffractions are sufficiently suppressed. From the paper and patent application by Tabiani and Kavehrad, supra, it is clear that a 2×2 coupler needs only one sinusoidal grating structure, the spatially varying refractive index of which can be represented as $$n(\vec{r}) = n[1 + \Delta \cos(\vec{K} \cdot \vec{r} + \Phi)] \qquad (2)$$

where $n_0$ is the average refractive index; $\vec{K}=(K_x, K_y, K_z)$ is the grating vector with $|\vec{K}|=2\pi/\lambda$; $\lambda$ is the grating period, and $\Phi$ is the initial phase of the grating. It should be noted that the same grating will result if $\vec{K}$ is changed to $-\vec{K}$, so in some of the figures in this specification vectors which have arrows at both ends will be used to represent a grating vector.

From coupled wave theory, it can be shown that, in the grating depicted by Equation 2, the two plane waves will be able to exchange power, i.e., be coupled by the grating. The strongest coupling happens when the Bragg condition is satisfied, i.e., $$\begin{cases} k_1 = k_2 = \dfrac{2\pi n}{\lambda} \\ \vec{k}_1 - \vec{k}_2 = \pm \vec{K} \end{cases} \qquad (3)$$

where n is the average refractive index of the diffraction means, and λ is the wavelength in free space.

Thus, such a volume grating is similar to a 2×2 coupler, coupling a pair of lightwaves, and the N×N coupler by Kavehrad and Tabiani, supra, can actually be considered as a series of 2×2 couplers coupling all the possible combinations of wave pairs from the N lightwave sources. It should be noted that the number of different combinations is just equal to the number of required gratings in the slab so, for a 4×4 star coupler using a volume diffraction means disclosed by Kavehrad and Tabiani, six different gratings would be needed. These gratings are:

$$\pm \vec{K}_{12} = \vec{k}_1 - \vec{k}_2 \quad (4)$$

$$\pm \vec{K}_{23} = \vec{k}_2 - \vec{k}_3 \quad (5)$$

$$\pm \vec{K}_{34} = \vec{k}_3 - \vec{k}_4 \quad (6)$$

$$\pm \vec{K}_{13} = \vec{k}_1 - \vec{k}_3 \quad (7)$$

$$\pm \vec{K}_{24} = \vec{k}_2 - \vec{k}_4 \quad (8)$$

$$\pm \vec{K}_{14} = \vec{k}_1 - \vec{k}_4 \quad (9)$$

where $$k_i = |\vec{k}_i| = \frac{2\pi n}{\lambda},$$

n is the average refractive index of the diffraction means, and λ is the wavelength in free space. It should be appreciated that either the plus sign or minus sign can be taken in the above equations without changing the final result. These vectors are illustrated in FIG. 3, with the starting points of the grating vectors so located as to emphasize the relationship between wave vectors $k_1$, $k_2$, $k_3$ and $k_4$, and grating vectors $K_{12}$, $K_{13}$, $K_{14}$, $K_{23}$, $K_{24}$, and $K_{34}$. Hereafter, it is assumed that each grating has a sinusoidal waveform and a zero initial phase, so each grating vector will completely characterize A, the periodic structure of a grating.

Figure 4:
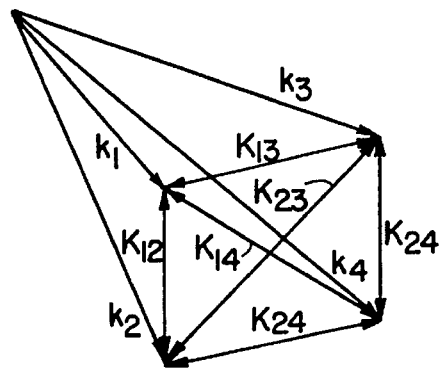
FIG. 4 is a vector diagram corresponding to that of FIG. 3, but with the vectors rearranged.
Figure 5:
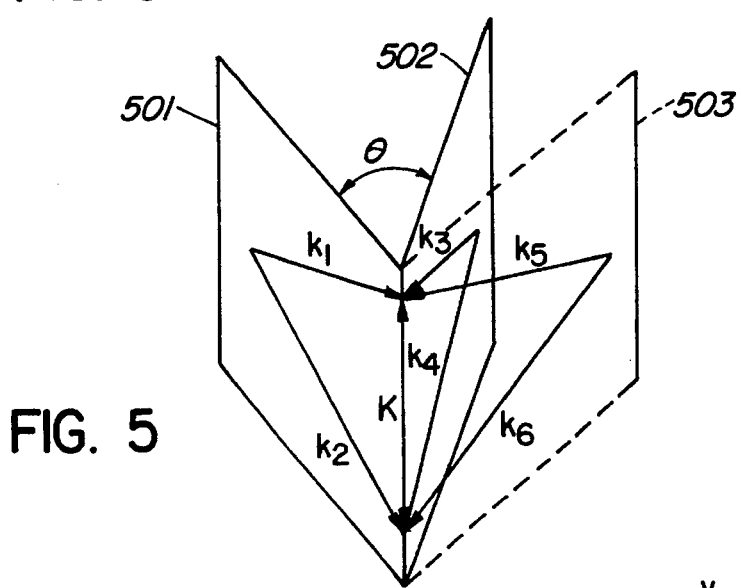
FIG. 5 is a vector diagram illustrating coupling of two or three pairs of light beams by one grating.

When the directions of the vectors are re-arranged as shown in FIG. 4, it can be seen clearly that $$\vec{K}_{12} = \vec{K}_{34}, \text{ and } \vec{K}_{13} = \vec{K}_{24}.$$

so there is redundancy. In embodiments of the present invention which use the diffraction means 101A illustrated in FIG. 1A, the redundant gratings are eliminated and the sources positioned so that the wave vectors of the waves are not confined to the same plane and the angular distributions of the wave vectors are not uniform. FIG. 5 illustrates how a degenerated grating represented by vector K, (which could be grating 101 of FIG. 1 grating 101A in FIG. 1A) couples two sets, each of two wave pairs $\{\vec{k}_1, \vec{k}_2\}$ and $\{\vec{k}_3, \vec{k}_4\}$, the first pair $k_1$, $k_2$ propagating in a first plane 501, and the second pair $k_3$, $k_4$ propagating in a second plane 502 which extends at an angle θ to plane 501. Both pairs satisfy the Bragg condition and hence can be coupled by the same grating characterized by $\vec{K}$ (with no coupling between different pairs). It should be noted that the angle θ, between the two planes 501 and 502 defined by the wave vector pairs, can be arbitrary so, for a single-grating system, a number of additional sets of wave pairs can satisfy the Bragg condition and thus be coupled by the same grating. Thus, as illustrated in broken lines in FIGS. 1 and 5, additional input means 105E and 105F could be added emitting an additional set of two light beams ($\vec{k}_5$, $\vec{k}_6$) extending in a third plane 503.

More sets can be added providing that they transmit in planes which extend in the direction of the grating vector where they intersect the diffraction grating.

Also, each set may comprise more than two sources or receivers, providing that they are aligned in the corresponding plane.

General expressions governing the arrangement of the wave vectors (hence the directions of the light beams) to achieve the sharing of gratings can be derived from Equation 3 as follows:

$$\begin{cases} k_{ix}^2 + k_{iy}^2 + k_{iz}^2 = \left(\frac{2\pi n}{\lambda}\right)^2 & (a) \\ \vec{k}_i \cdot \vec{K} = \frac{K^2}{2} & (b) \\ k_j = k_i - \vec{K} & (c) \end{cases} \quad (10)$$

where i, j=1, 2, ..., N.

Figure 6:
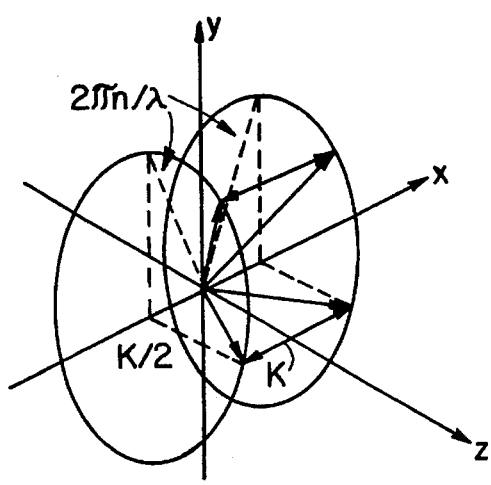
FIG. 6 is a vector diagram illustrating how various other coupling arrangements may be determined for a single grating.

The geometry of these equations is shown in FIG. 6. The first two equations 10(a) and 10(b) represent a spherical surface and a plane. The intersection of these surfaces makes a circle which is the trajectory of one of the wave vector tips. The other wave vector is determined by the third line (c) in Equation 10. Its trajectory makes the second circle. Without loss of generality, it can be assumed that $\vec{K} = K\hat{x}$, $\vec{x}$ is the unit vector in the x direction. This can be done by simply rotating the coordinate system. Thus, $$\begin{cases} k_{iy}^2 + k_{iz}^2 = \left(\frac{2\pi n}{\lambda}\right)^2 - \left(\frac{K}{2}\right)^2 \\ k_{ix} = \frac{K}{2} = -k_{jx} \\ k_{iy} = k_{jy} \\ k_{iz} = k_{jz} \end{cases} \quad (11)$$

where i, j=1, 2, ..., N. Any wave vector pairs $\vec{k}_i$, $\vec{k}_j$ which satisfy Equation 10 or Equation 11 will be able to share the same grating $\vec{K}$.

Figure 7:
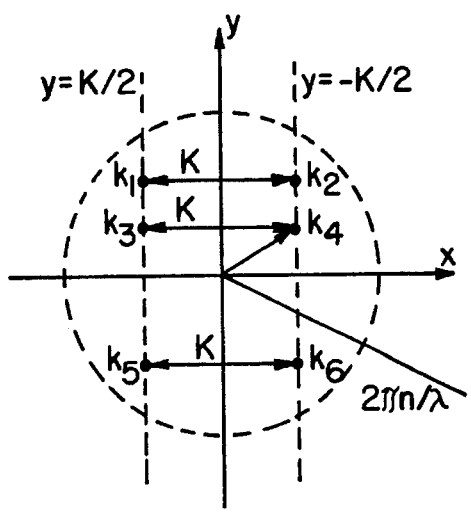
FIG. 7 is a vector tip representation corresponding to FIG. 5.

Another way of depicting the vector arrangement of FIG. 5 is a two dimensional tip-pattern diagram as shown in FIG. 7. Though only the projections of the wave vector tips and grating vectors on the plane z=0 can be seen in FIG. 7, the vectors, and hence the directions of waves and gratings, are still uniquely determined by the tip-pattern diagram. The reason is that out of the three components of the wave vectors only two are independent. The third component and the grating vectors can be found by the following formulae:

$$\begin{cases} k_{iz} = \sqrt{\left(\frac{2\pi n}{\lambda}\right)^2 - (k_{ix}^2 + k_{iy}^2)} & i = 1, 2, \ldots, N \\ \vec{K}_{ij} = \vec{k}_i - \vec{k}_j & i, j = 1, 2, \ldots, N \end{cases} \quad (12)$$

The tip-pattern diagram is important because of its two dimensional nature. All the designs given later in this description will be presented as wave vector tip-pattern diagrams. It can be shown that, under Fresnel approximation, a tip-pattern is actually the pattern of fiber end arrangements on each focal plane when it is scaled by a factor $$\pm \frac{\lambda f}{2\pi n},$$

where the plus sign is for the receiving side and the minus sign for the transmitting side of the coupler.

When a tip-pattern is used, the tip trajectories become two dimensional and can be obtained by cancelling the z components of the wave vectors in Equation 10. These are generally two second order curves where one is the shifted version of the other. In a special case, when $K_z=0$, the trajectories become two parallel straight lines:

$$\begin{cases} k_{ix}K_x + k_{iy}K_y = -\dfrac{K^2}{2} \\ k_{jx} = k_{ix} - K_x \\ k_{jy} = k_{iy} - K_y \end{cases} \tag{13}$$

The foregoing discussion of the mathematical basis for the operation of the coupler can, of course, be applied to the vectors $\vec{k}_{12}$, $\vec{k}_{13}$, of FIG. 1A.

Referring now to FIG. 8, in a second embodiment of the invention the number of gratings required for coupling a desired number of input/output pairs is reduced by using a sandwich of at least two diffraction means, each comprising at least one volume diffraction grating. Thus, in FIG. 8, a sandwiched diffraction means 801 comprises a first diffraction means 801A, a second diffraction means and 801B and two lenses 802 and 803 with a common optical axis 804. Lens 802 is interposed between the first diffraction means 801A and an array of sources in the form of optical fibers 805A to 805D for directing light beams represented by wave vectors $K_1$, $K_2$, $K_3$ and $K_4$, respectively onto the first diffraction means 801A. A second lens 803 is interposed between the diffraction means 801B and an array of receivers in the form of optical fibers 807A to 807D. Unlike the embodiment of FIG. 1, the fibers 805A to 805D and 807A to 807D are in linear, arcuate arrays.

As shown in FIG. 9, the vector diagram for the sandwiched diffraction means 801, gratings $\vec{K}_{14}$ and $\vec{K}_{23}$ are omitted. In the first volume diffraction means 801A, two gratings are recorded, namely $\vec{K}_{12}$ and $\vec{K}_{34}$. The second volume diffraction means 801B contains the gratings $\vec{K}_{13}$ and $\vec{K}_{24}$. Referring to FIG. 9, after the four input light wave $k_1$ to $k_4$ emerge from the first diffraction means 801A, the wave fields corresponding to fibers 105A and 105B are coupled by the grating represented by grating vector $\vec{K}_{12}$, and the wave fields corresponding to fibers 105C and 105D are coupled by the grating represented by grating vector $\vec{K}_{34}$. Generally:

$$I_1^{(1)} = (1-\eta_{12})I_1^{(0)} + \eta_{12}I_2^{(0)} \tag{14}$$

$$I_2^{(1)} = \eta_{12}I_1^{(0)} + (1-\eta_{12})I_2^{(0)} \tag{15}$$

$$I_3^{(1)} = (1-\eta_{34})I_3^{(0)} + \eta_{34}I_4^{(0)} \tag{16}$$

$$I_4^{(1)} = \eta_{34}I_3^{(0)} + (1-\eta_{34})I_4^{(0)} \tag{17}$$

where $I_i^{(1)}$ (i=1,2,3,4, j=0,1,2) stands for the intensity of the i-th wave at the output of the j-th diffraction means. Variable $\eta_{kl}$ (k,l=1,2,3,4, ) is the diffraction efficiency of the grating characterized by the vector $\vec{K}_{kl}$.

After the waves pass through the second diffraction means 801B, the four outputs can be expressed as $$I_1^{(2)} = (1-\eta_{13})(1-\eta_{12})I_1^{(0)} + (1-\eta_{13})\eta_{12}I_2^{(0)} + \eta_{13}(1-\eta_{34})I_3^{(0)} + \eta_{13}\eta_{34}I_4^{(0)} \tag{18}$$

$$I_2^{(2)} = (1-\eta_{24})\eta_{12}I_1^{(0)} + (1-\eta_{24})(1-\eta_{12})I_2^{(0)} + \eta_{24}\eta_{34}I_3^{(0)} = \eta_{24}(1-\eta_{34})I_4^{(0)} \tag{19}$$

$$I_3^{(2)} = \eta_{13}(1-\eta_{12})I_1^{(0)} + \eta_{13}\eta_{12}I_2^{(0)} + (1-\eta_{13}(1-\eta_{34})I_3^{(0)} + (1-\eta_{13})\eta_{34}I_4^{(0)} \tag{20}$$

$$I_4^{(2)} = \eta_{24}\eta_{12}I_1^{(0)} + \eta_{24}(1-\eta_{12})I_2^{(0)} + (1-\eta_{24})\eta_{12}I_3^{(0)} + (1-\eta_{24})(1-\eta_{34})I_4^{(0)} \tag{21}$$

It can be seen that each of the output fibers 807A to 807D can receive signals from all the input fibers 805A to 805D In a special case, when $\eta_{ij}$=50% each input wave will have its power evenly distributed among all four outputs. Accordingly, even though gratings $\vec{K}_{14}$ and $\vec{K}_{23}$ have been omitted, the interconnection device of FIG. 8 is still a 4×4 coupler, with each slab 801A, 801B containing only two gratings.

From a logic connection point of view, the sandwiched diffraction means 801 is similar to a star coupler made from a number of 2×2 fiber couplers, as shown in FIG. 10. The number of separate diffraction means in the sandwiched diffraction means 801 corresponds exactly to the number of stages in the coupler in FIG. 10.

Figure 11:
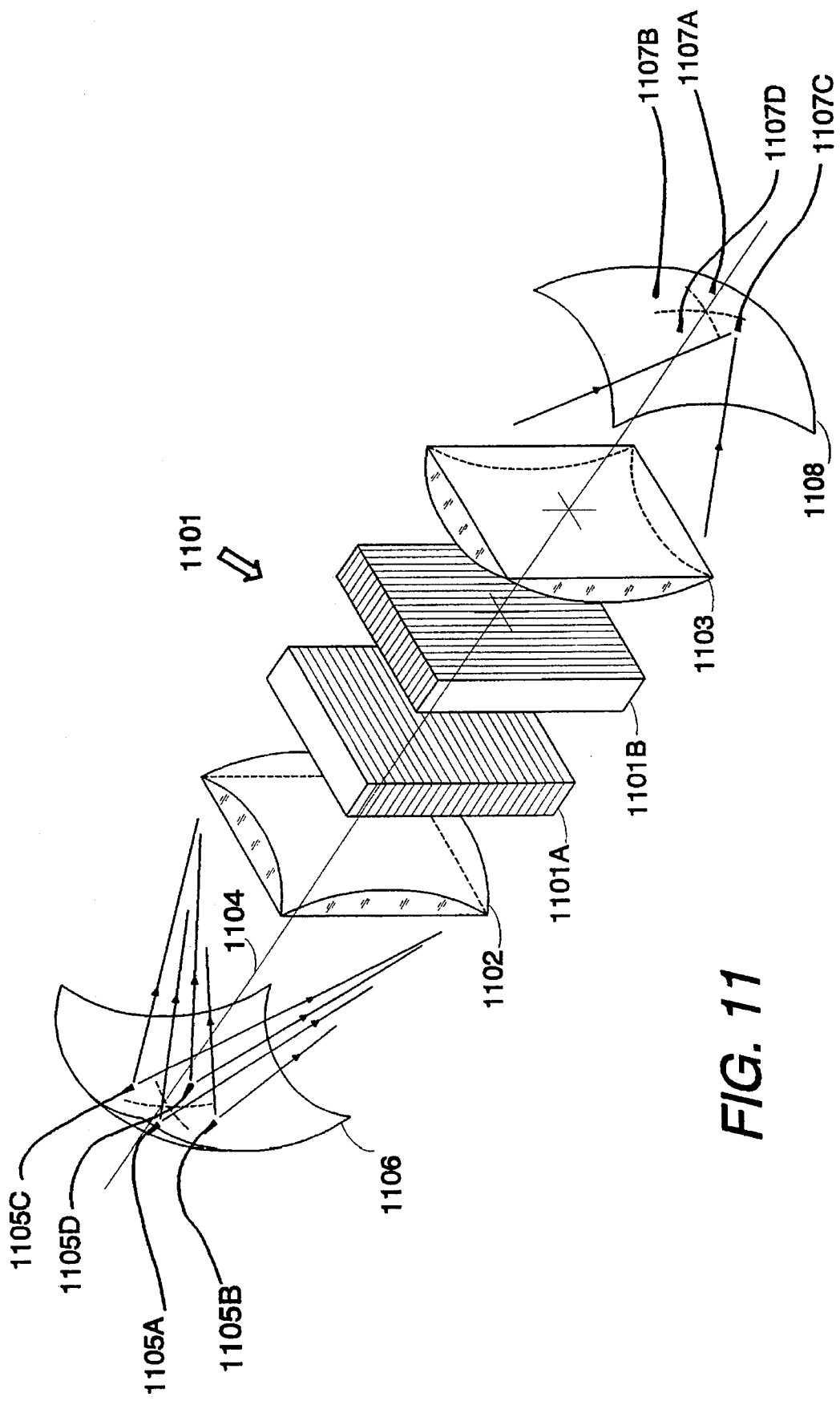
FIG. 11 is an exploded perspective view of an interconnection device combining both aspects of the invention and employing two "degenerated" volume diffraction gratings in tandem.

In a practical coupler, it is possible, and preferable, to combine both aspects of the invention, namely tandem degenerated volume diffraction means, in a single interconnection device as illustrated in FIG. 11. The combined interconnection device of FIG. 11 is a 4×4 coupler similar to that described with reference to FIGS. 1 and 1A. It differs, however, in that its diffraction means 1101 comprises two diffraction means 1101A and 1101B disposed between a pair of convex lenses 1102 and 1103, respectively, with a common optical axis 1104. The two diffraction means 1101A and 1101B are each degenerated to one grating and the directions of the input light beams adjusted accordingly, as in the embodiment of FIG. 1. Thus, an array of input optical fibers 1105A, 1105B, 1105C and 1105D are mounted to a spherical surface 1106, with their ends in a rectangular array and normal to the spherical surface 1106 so that light beams from the fibers will be directed towards the centre of the lens 1102. A similar array of optical fibers 1107A, 1107B, 1107C and 1107D are mounted normal to the spherical surface 1108 so as to receive light beams from lens 1103. The radius of each of the spherical surfaces 1106 and 1108 is equal to the focal length of the adjacent one of the lenses 1102 and 1103.

FIG. 12A shows the wave vector tip-patterns for the 4×4 star coupler of FIG. 11. First volume diffraction means 1101A is represented by vector $K_{12}$ and second volume diffraction means 1101B is represented by vector $K_{13}$. It can be verified that these designs satisfy Equation 13.

As in the other embodiments, light beams from fibers 1105A to 1105D will be collimated by the lens 1102 to produce four plane waves incident upon the first degenerated volume grating 1101A. The degenerated first volume grating 1101A comprising grating $K_{13}$ couples the light beams "vertically" in pairs. The second volume grating 1101B couples the waves "horizontally" in pairs. It should be noted that the vectors $\vec{K}_{12}$ and $\vec{K}_{13}$ are shown vertical and horizontal merely for convenience of illustration. Other orientations, not necessarily perpendicular to each other, may be used. As described earlier, the two volume gratings 1101A and 1101B will couple the light beams differently and in such a way that their combination gives the total desired coupling of each of inputs 1105A to 1105D with all of the output fibres 1107A to 1107D. On leaving the volume grating 1101B, the light beams are focused by the lens 1103 to the corresponding optical fibers 1107A to 1107D, respectively.

Using complex amplitude, the light field at the input spherical surface 1106 can be expressed as:

$$E(x, y) = \sum_{i=1}^{N} A_i \psi(x - x_i, y - y_i) \quad (22)$$

where $\psi(x,y)$ stands for the dominant mode of a fiber, $(x_i, Y_i)$ stands for the lateral position of the i-th fiber end, and $A_i$ represents the amplitude of the field from the i-th fiber. After propagation through free-space and passage through lens 1102, the light field at the input to volume diffraction means 1101A, becomes:

$$E^-(x, y) = \frac{e^{j\frac{2\pi}{\lambda}f}}{\lambda f} p(x, y) FF\{E(x, y)\}\Big|_{\xi=\frac{x}{\lambda f}, \eta=\frac{y}{\lambda f}}$$

$$= \frac{e^{j\frac{2\pi}{\lambda}f}}{\lambda f} p(x, y) \sum_{i=1}^{N} A_i \Psi\left(\frac{x}{\lambda f}, \frac{y}{\lambda f}\right) e^{-j\frac{2\pi}{\lambda f}(x_i x + y_i y)} \quad (23)$$

Where $FF\{.\}$ stands for the two dimensional Fourier transformation, $\xi$ and $\eta$ are components of the spatial frequencies corresponding to the directions of x and y, f is the focal length of the lenses 1102 and 1103, $\Psi(\xi,\eta) = FF\{\psi(x,y)\}$ and $p(x,y)$ represents the aperture area of the lens 1102. The aperture area of the lens 1102 can be considered as a spatial low-pass filter and has a Fourier transform $P(\xi,\eta)$.

At the output side of the second volume diffraction means 1101B, the field can be expressed as:

$$E^+(x, y) = \quad (24)$$

$$\frac{e^{j\frac{2\pi}{\lambda}f}}{\lambda f} p(x, y) \sum_{i=1}^{N} A_i' \Psi\left(\frac{x}{\lambda f}, \frac{y}{\lambda f}\right) e^{-j\frac{2\pi}{\lambda f}(x_i x + y_i y)}$$

where $$A_i' = \sum_{j=1}^{N} C_{ij} A_j \quad (25)$$

and $c_{ij}$ is the coupling coefficient between the i-th and j-th waves. Equation 25 is a mathematical expression that depicts the function of the sandwich comprising volume diffraction means 1101A and 1101B.

Similarly, at the output spherical surface 1108, the field can be written as:

$$E'(x, y) = \frac{e^{j\frac{2\pi}{\lambda}f}}{\lambda f} FF\{E^+(x, y)\}\Big|_{\xi=\frac{x}{\lambda f}, \eta=\frac{y}{\lambda f}} \quad (26)$$

$$= e^{j\frac{4\pi}{\lambda}f} \sum_{i=1}^{N} A_i' \psi(x + x_i, y + y_i) * \frac{i}{(\lambda f)^2} P\left(\frac{x}{\lambda f}, \frac{y}{\lambda f}\right)$$

where it is assumed the dominant mode has the symmetry:

$$\psi(x,y) = \psi(-x,-y)$$

When the numerical aperture of the lenses 1102 and 1103 is larger than that of the fibers:

$$\frac{1}{(\lambda f)^2} P\left(\frac{x}{\lambda f}, \frac{y}{\lambda f}\right) = \delta(x, y)$$

and $$E'(x, y) \rightarrow e^{j\frac{4\pi}{\lambda}f} \sum_{i=1}^{N} A_i' \psi(x + x_i, y + y_i)$$

which holds the same mode pattern as that of $E(x,y)$.

Since each of the fibers 1107A to 1107D need only receive light incident normally on its end, and the numerical aperture of the lens 1103 is much larger than that of the fibers, mode matching does not present a problem because the field pattern on the receiving side of the coupler is the image of the field on the transmitting side.

The reduction in the number of gratings is quite significant. In practice, constructing six different gratings in a single slab probably requires high standard facilities and good experimental skills, while recording one volume grating in a slab with a diffraction efficiency of 50% is such a simple task that it can be done with basic holographic recording equipment.

General optimum design criteria for an arbitrary N could be deduced given the number of diffraction means, number of gratings in each and the geometry. When N is small (e.g., $N \leq 16$), the arrangement is quite obvious. Besides, when N is small, the number of grating layers is also small and excess loss due to cascading need not be of concern. From experience with the material DCG, it is quite conservative to expect the excess loss of each layer to be below 0.1 dB.

Therefore, the excess loss of, for example, 10 gratings can be kept below 1 dB.

FIGS. 12B and 12C illustrate wave vector tip patterns for 8×8 and 16×16 couplers, respectively. These designs also satisfy Equation 3 or 13. As illustrated in FIG. 12B, an 8×8 coupler comprises three slabs, the first comprising one grating $\vec{K}_{15}$, the second slab comprising two gratings $\vec{K}_{14}$ and $\vec{K}_{67}$, and the third slab comprising the two gratings $\vec{K}_{12}$ and $\vec{K}_{78}$. The eight sources are arranged in two sets of four, each set aligned vertically in the drawings.

A 16×16 coupler as illustrated in FIG. 12C comprises four diffraction means in tandem and the sources are arranged in four sets of four forming a rectangular array. The first diffraction means or slab comprises two gratings $\vec{K}_{11,41}$ and $\vec{K}_{22,23}$; the second comprises two gratings $\vec{K}_{11,14}$ and $\vec{K}_{22,23}$; the third comprises four gratings $\vec{K}_{11,21}$, $\vec{K}_{12,22}$, $\vec{K}_{33,43}$ and $\vec{K}_{34,44}$; and the fourth comprises four gratings $\vec{K}_{31,32}$, $\vec{K}_{41,42}$, $\vec{K}_{13,14}$ and $\vec{K}_{23,24}$. Thus, for the 16×16 coupler, coupling of each of the sources with all of the receivers can be achieved with no more than 4 different gratings in each slab whereas, with a one-slab-no-degeneration configuration as disclosed by Tabiani and Kavehrad, 120 different gratings would be needed in one slab.

Figure 13:
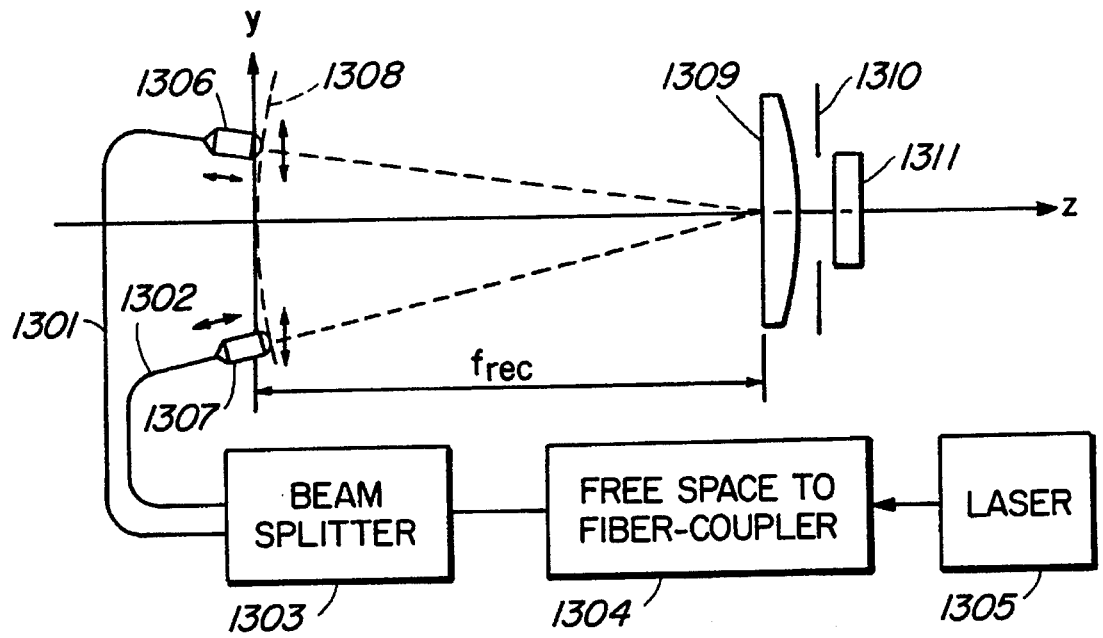
FIG. 13 is a schematic diagram of apparatus for constructing a volume diffraction means for use in embodiments of the invention.

It is envisaged that the diffraction gratings will be formed using holographic techniques similar to those disclosed in International patent application number PCT/CA 91/00113, which is incorporated herein by reference, in which two lightwaves interfere with each other and the resulting interference pattern is recorded on a body of light sensitive material whose refractive index, after processing, will be directly proportional to the intensity of the interference field. FIG. 13 shows a schematic diagram of an apparatus for constructing the grating. The optics are generally equivalent to the input half of the coupler in FIG. 11. Two single mode, polarization-preserving fibers 1301 and 1302 are each connected at one end to a respective output of a beam splitter 1303 which is supplied by way of free space-to-fiber coupler 1304 from a laser light source 1305. The other ends of the fibers 1301 and 1302 are mounted by two optical fiber positioning means 1306 and 1307 for accurate movement in two directions defining a spherical surface 1308. The radius of curvature of spherical surface 1308 is equal to the focal length $f_{rec}$ of a lens 1309. The fiber positioning means 1306 and 1307 are normal to the spherical surface 1308 and direct light to the centre of lens 1309. The positioning means 1306 and 1307 are also movable radially for focusing. After passing through the lens 1309, the light beams pass through an iris 1310 to the recording dielectric slab 1311.

In order to get a uniform illumination during the exposure, the focal length $f_{rec}$ is several times larger than the focal length f of the lenses 1102 and 1103 of the coupler, so that only a small portion of the wave front from the fibers will be used.

Operation of the apparatus is similar to that in PCT/CA 90/00113 to make a diffraction means 801A or 801B for the coupler of FIG. 8. Whereas Tabiani and Kavehrad would move or scan sources in one plane, embodiments of the invention require the sources to be moved, or scanned, in two transverse directions. A 16×16 coupler, for example, will require four diffraction means or slabs, each comprising two gratings or four gratings, as described previously. Each slab will be exposed once for each grating with the light sources in positions corresponding to those of the coupler in which the diffraction means are to be used.

Thus, in making a diffraction means 101 (FIG. 1), or 1101A or 1101B (FIG. 11), the fiber light sources 1306 and 1307 are moved to respective positions corresponding to a pair of inputs of the coupler and the dielectric slab 1311 exposed for each position. These positions can be directly determined from the tip-pattern design by the following equations:

$$\begin{cases} x = -\dfrac{\lambda_{rec} f_{rec}}{2\pi} k_x \\ y = -\dfrac{\lambda_{rec} f_{rec}}{2\pi} k_y \end{cases} \quad (27)$$

Since plane wave systems are used, a different wavelength can be used for grating construction. The most important relation for the grating recording is $$\vec{h}_j - \vec{h}_i = \vec{K}_{ij} \quad (28)$$

where $\vec{h}_j$, $\vec{h}_i$ are wave vectors of the two waves used in constructing grating $\vec{K}_{ij}$. Equation 28 is very similar to the second line of Equation 3 in appearance. Combining these two equations yields $$\vec{h}_j - \vec{h}_i = \vec{k}_j - \vec{k}_i \quad (29)$$

Figure 14:
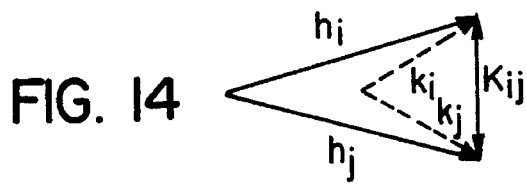
FIG. 14 is a vector representation of the relationship between light waves used to "write" the volume diffraction means and light waves coupled by it when in use.

The geometric interpretation is shown in FIG. 14. It should be noted that $$h_i = h_j = \frac{2\pi n}{\lambda_{rec}},$$

where $\lambda_{rec}$ is the wavelength used in construction, which is probably 0.514 μm when DCG is used.

It will be appreciated that, instead of two movable light sources which are moved to the desired positions between exposures, an array of light sources could be provided and different pairs energized, in sequence, to the same effect.

Because the grating patterns written into the diffraction means are planar, a single large body of photographic material could be exposed to produce the required interference patterns and diced to produce a plurality of diffraction means with the same pattern. This would reduce production costs.

Figure 15:
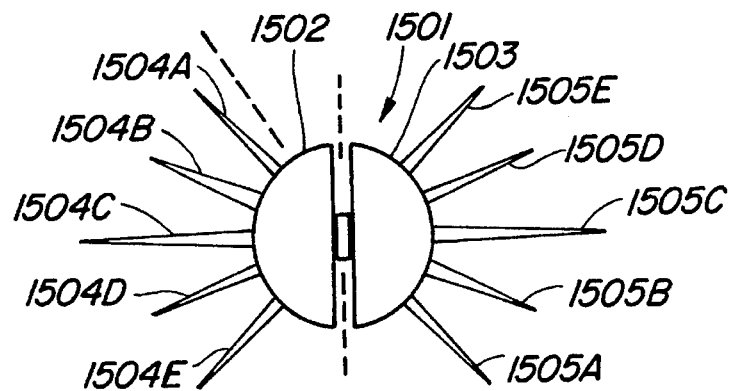
FIG. 15 illustrates alternative input means and output means.

In the specific embodiments described herein, the light beams propagate in free space between each set of optical fibers and the respective lens, with the spherical surface being either a physical surface to which the ends of the optical fibers are mounted or simply a notional surface defined by the ends of the optical fibers and their orientations. It is envisaged, however, that other arrangements might be used. For example, as shown in FIG. 15, the spherical surfaces might comprise surfaces of solid hemispherical glass blocks 1501 and 1502, their planar surfaces in contact with the volume gratings 1501 and index matched to the them. The input array of optical waveguides then comprise tapered ends of optical fibers 1504A to 1504E and the output array comprise tapered ends of optical fibers 1505A to 1505E.

Figure 16:
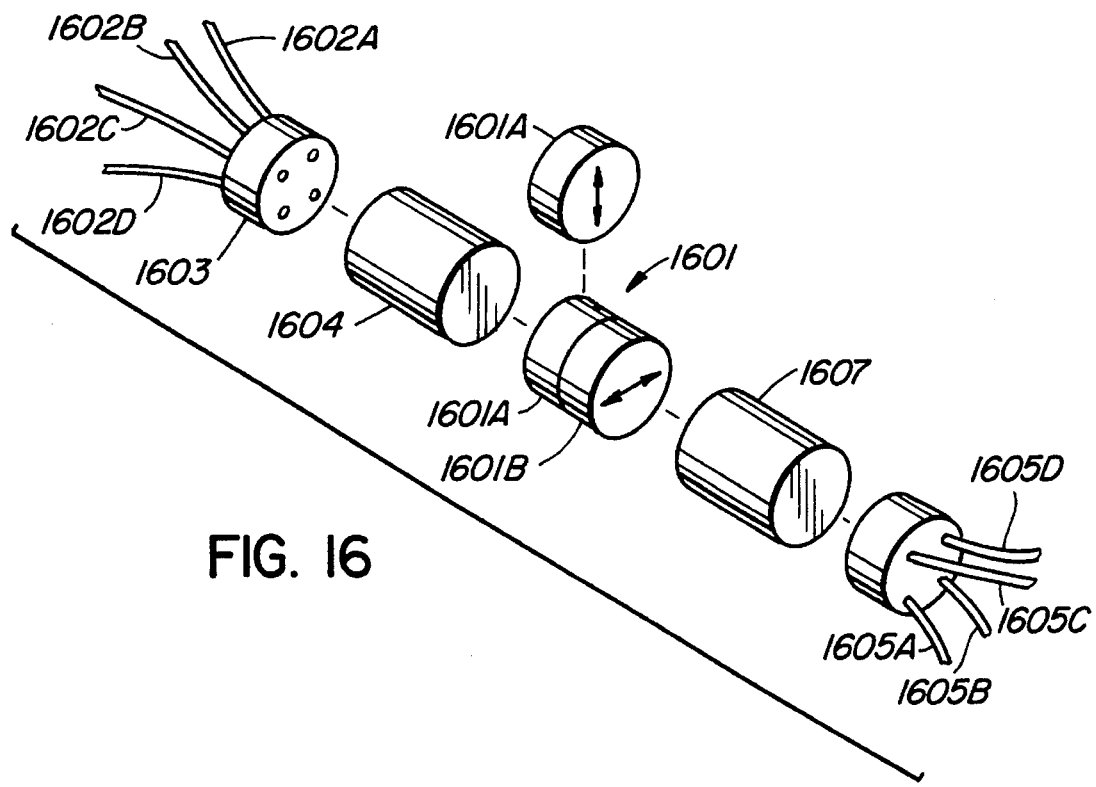
FIG. 16 is an exploded perspective view of another embodiment of the invention comprising rod lenses.
Figure 17:
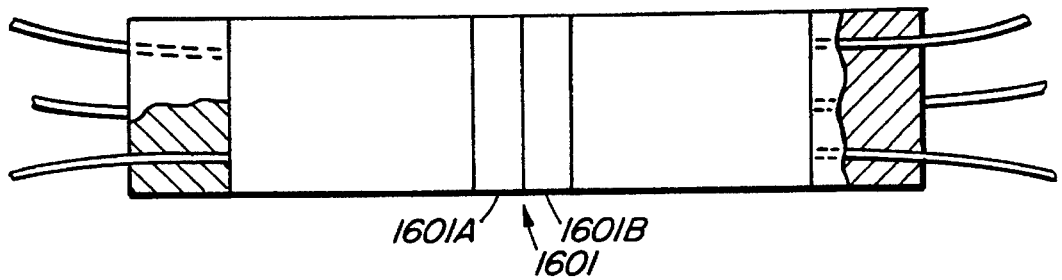
FIG. 17 is a longitudinal cross-section through the device of FIG. 16.
Figures 18A, 18B, 18C:
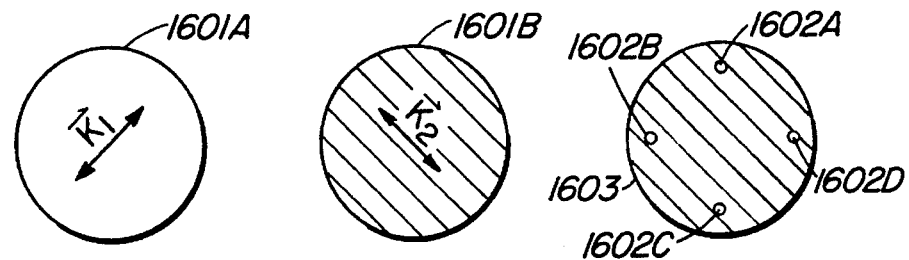
FIGS. 18A, 18B and 18C are cross-sections through the device.

Alternatively, each set of fibers might be attached to a rod lens having a cross-section matching that of the volume diffraction means and index-matched. The rod lenses would then abut respective sides of the volume diffraction means. Thus, as illustrated in FIGS. 16 to 18, the diffraction means 1601 comprises two sandwiched volume diffraction grating slabs 1601A and 1601B. As illustrated by the cross-sectional views of FIGS. 18A and 18B, the grating patterns of these diffraction means 1601A and 1601B will be the same as those of the interconnection device described with reference to FIG. 11. The input optical fibers 1602A, 1602B, 1602C and 1602D are mounted in a cylindrical boss 1603, shown in cross-section in FIG. 18C, which abuts the end of a cylindrical rod lens 1604. The other end of the rod lens 1604 abuts the input face of diffraction grating slab 1601A. The output means is similar in that the four output optical fibers 1605A, 1605B, 1605C and 1605D are clustered in a cylindrical boss 1606 which abuts on end of an output cylindrical rod lens 1607. The other end of rod lens 1607 abuts the output face of diffraction grating slab 1601B.

Both the input optical fibers 1602A–1602D and the output optical fibers 1602A–1602D are parallel to the optical axis 1608 of the device. The input rod lens 1604 comprises a one quarter pitch lens and its refractive index varies radially so that the input light beams are collimated when they arrive at the diffraction grating slab 1601A, in pairs in the required intersecting planes as previously described. The refractive index of output rod lens 1607, which also is a one quarter pitch lens, also varies radially so as to focus the light beams emerging from the diffraction grating slab 1601B so that they converge to the appropriate output optical fiber or port.

It will be appreciated that this configuration of input means and output means, employing graded-index rod lenses, is not limited to the sandwiched volume diffraction means but could be used with any of the volume diffraction means described herein.

Embodiments of the invention may be used no only in local area networks and backplanes of telecommunications and computer equipment, but also to interconnect components in integrated circuits, to interconnect integration circuits on a circuit board and in analogous situations in the field of optical communications, especially where single mode optical fibers are to be interconnected.

Although embodiments of the invention have been described and illustrated in detail, it is to be clearly understood that the same is by way of illustration and example only and is not to be taken by way of limitation, the spirit and scope of the present invention being limited only by the appended claims.

We claim:

1. An optical interconnection device comprising Bragg diffraction means for diffracting input light beams into a plurality of output light beams, said Bragg diffraction means comprising at least one volume diffraction grating means for diffracting at least one input light beam into zero order and first order output light beams, said volume diffraction grating means having a grating pattern with a grating vector in a first direction; input means for directing a plurality of input light beams onto said volume diffraction grating means, each input light beam being collimated when incident upon the volume diffraction grating means and oriented according to Bragg conditions with respect to the grating pattern so that each input light beam results in a corresponding zero order beam and a first order beam leaving said volume diffraction grating means, said input means comprising a first source and a second source spaced apart to direct first and second said input light beams, respectively, in a first plane to the volume diffraction grating means, and a third source and a fourth source spaced apart to direct third and fourth said input light beams, respectively, in a second plane to the volume diffraction grating means, the first and second planes extending parallel to the grating vector but not being coplanar, said grating pattern diffracting the first, second, third and fourth input light beams to produce said plurality of output light beams so that the zero order of the first source and the first order of the second source are coincident, the zero order of the second source and the first order of the first source are coincident, the zero order of the third source and the first order of the first source are coincident and the zero order of the fourth source and the first order of the third source are coincident; and output means for receiving said plurality of output light beams, said output means comprising first, second, third and fourth receivers spaced apart, the first receiver to receive the zero order of the first source and the first order of the second source, the second receiver to receive the zero order of the second source and the first order of the first source, the third receiver to receive the zero order of the third source and the first order of the fourth source, and the fourth receiver to receive the zero order of the fourth source and the first order of the third source.

2. An interconnection device as claimed in claim 1, wherein said volume diffraction grating means comprises a second grating pattern having a grating vector perpendicular to that of the first grating pattern said first source and said third source being spaced apart so that said first light beam and said second light beam are incident upon the volume diffraction grating means according to Bragg conditions with respect to the second grating pattern, the second grating pattern diffracting the input light beams so that the first receiver receives also a first order beam from the third source, the second receiver receives also a first order beam from the fourth source, the third receiver also a first order beam from the first source and the fourth receiver receives also a first order beam from the second source.

3. An interconnection device as claimed in claim 2, wherein said volume diffraction grating means further comprises a third grating pattern having a grating vector extending diagonally with respect to the first and second grating vectors such that the first input light beam and the fourth input light beam are incident upon the volume diffraction grating means according to Bragg conditions with respect to the third grating pattern, and a fourth grating pattern having a grating vector extending diagonally with respect to the first and second grating vectors and transversely of the grating vector of the third grating pattern such that the second input light beam and third input light beam are incident upon the volume diffraction grating means according to Bragg conditions with respect to the fourth grating pattern, such that the first receiver also receives a first order beam from said fourth source, said fourth receiver also receives a first order beam from said first source, said second receiver also receives a first order beam from said second source and said third receiver also receives a first order beam from said third source.

4. An interconnection device as claimed in claim 1, wherein the input means comprises at least one additional pair of sources spaced apart to direct at least one additional pair of input light beams onto the volume diffraction grating means according to Bragg conditions with respect to said grating pattern in a third plane inclined relative to the first and second planes, and said output means comprises at least one additional pair of receivers, one of the additional pair of receivers being arranged to receive a zero order beam from one source of the additional pair of sources and a first order beam from the other of the additional pair of sources, the other of the additional pair of receivers being arranged to receive a zero order beam from said other of the additional pair of sources and a first order beam from said one of the additional pair of sources.

5. An interconnection device as claimed in claim 1, further comprising a second volume diffraction grating means for diffracting at least one light beam into zero order and first order output light beams, said second volume diffraction grating means in tandem with the first volume diffraction grating means, the first volume diffraction grating means being arranged to provide a predetermined diffraction of said input light beams according to Bragg conditions and the second volume diffraction grating means being arranged to provide a predetermined diffraction of the diffracted input light beams according to Bragg conditions, such that coupling of all of said sources with all of said receivers is achieved for light beams passing through both of said volume diffraction grating means.

6. An interconnection device as claimed in claim 1, wherein the sources are configured for emitting divergent spherical said input light beams and the receivers are configured for receiving convergent spherical said output light beams, said input means comprising input lens means for collimating spherical light beams before incidence upon the volume diffraction grating means, and said output means comprising output lens means for converting planar output light beams having said volume diffraction grating means into spherical output light beams.

7. An interconnection device as claimed in claim 6, wherein said input lens means comprises a converging lens and the sources are arranged in a spheric array that is concentric with a geometric center of the converging lens and has a radius of curvature equal to the focal length of the lens means, said sources being aligned for emitting said input light beams towards said geometric center.

8. An interconnection device as claimed in claim 6, wherein each said lens means comprises a one-quarter pitch graded-index rod lens, the input rod lens having one end juxtaposed to the volume diffraction grating means and said sources arrayed at its other end and its refractive index varying such that light beams from the sources are each collimated on leaving said one end, and the output rod lens having one end juxtaposed to the volume diffraction grating means and the receivers arrayed at its other end with its refractive index varying so as to focus collimated light beams from the volume diffraction grating means to their respective receivers.

9. An interconnection device as claimed in claim 8, wherein said sources and said receivers are arranged to emit and receive, respectively, light beams parallel to the optical axis of the lens means, and the refractive index of the input lens means varies such that the light beams are incident upon the volume diffraction grating means from different directions, and the refractive index of the output lens means varies such that light beams leaving said volume diffraction grating means are parallel to said optical axis when incident upon the receivers.

10. An interconnection device as claimed in claim 1, wherein said input means and said output means comprise first and second hemispherical bodies, respectively, each of the hemispherical bodies having a planar surface and a hemispherical surface, the volume diffraction grating means being sandwiched between respective planar surfaces of the hemispherical bodies, a mean refractive index of the volume diffraction grating means being matched to respective refractive indexes of the hemispherical bodies, the sources comprising optical waveguides disposed about the hemispherical surface of the first hemispherical body, and the receivers comprising optical waveguides disposed about the hemispherical surface of the second hemispherical body, each optical waveguide having a tapered end portion diverging towards its end abutting the corresponding hemispherical surface.

11. An optical interconnection device comprising first and second volume diffraction grating means for diffracting at least one input light beam into zero order and first order light beams, said first and second diffraction grating means disposed between input means for directing a plurality of input light beams onto said first volume diffraction grating means and output means for receiving at least some of said zero order and first order light beams, the input means being arranged to direct first, second, third and fourth input light beams from first, second, third and fourth sources, respectively, in a common plane onto the first volume diffraction grating means, the first volume diffraction grating means comprising a first grating pattern and a second grating pattern having first and second grating vectors, respectively, inclined relative to each other and extending in said common plane;

the first input light beam and the second input light beam being incident upon the first volume diffraction grating means according to Bragg conditions with respect to the first grating pattern such that a zero order beam from the first input light beam and a first order beam from the second input light beam are coincident, forming a first beam pair and a zero order beam from the second input light beam and a first order beam from the first input light beam are coincident forming a second beam pair;

the third input light beam and the fourth input light beam being incident upon the first volume diffraction grating means according to Bragg conditions with respect to the second grating pattern such that a zero order beam from the third input light beam and a first order beam from the fourth input light beam are coincident, forming a third beam pair, and a zero order beam from the fourth input light beam and a first order beam from the third input light beam are coincident forming a fourth beam pair;

the second volume diffraction grating means comprising third and fourth grating patterns with third and fourth grating vectors, respectively, inclined relative to each other and the first and second grating vectors and extending in said common plane, said first beam pair and said third beam pair being incident upon the second volume diffraction grating means according to Bragg conditions with respect to the third grating pattern such that a first output beam from the second volume diffraction grating means comprises a zero order beam from the first source and first order beams from each of the second, third and fourth sources, and a second output beam from the second volume diffraction grating means comprises a zero order from the third source and a first order beam from each of the first, second and fourth sources;

said second beam pair and said fourth beam pair being incident upon the second volume diffraction grating means according to Bragg conditions with respect to the fourth grating pattern such that a third output beam from the second volume diffraction grating means comprises a zero order beam from the second source and a first order beam from each of the first, third and fourth sources, and a fourth output beam from the second volume diffraction grating means comprises a zero order beam from the fourth source and a first order beam from each of the first, second and third sources;

the output means comprising first, second, third and fourth receivers for receiving the first, second, third and fourth output beams, respectively.

12. An interconnection device as claimed in claim 11, wherein said sources are configured for emitting divergent spherical said input light beams and the receivers are configured for receiving convergent spherical said output light beams, the device further comprising input lens means for collimating divergent input spherical light beams before incidence upon the first volume diffraction grating means, and output lens means for converting planar light beams output from said second volume diffraction grating means into convergent spherical output light beams.

13. An interconnection device as claimed in claim 12, wherein said input lens means comprises a converging lens and the sources are arranged in a spheric array that is concentric with the input lens means, and has a radius of curvature equal to the focal length of the input lens means said sources being arranged for emitting said input light beams towards a geometric center of the converging lens, and said receivers are arranged in second spheric array that is concentric with the output lens means and has a radius of curvature equal to the focal length of the output lens means.

14. An interconnection device as claimed in claim 12, wherein said input lens means comprises a one quarter pitch graded-index rod lens having one end juxtaposed to the diffraction means and said sources arrayed at its other end, the refractive index of the input rod lens varying so as to collimate each of input spherical light beams, and the output lens means comprises a second one quarter pitch graded-index rod lens having one end juxtaposed to the diffraction means and the receivers arranged at its other end, the refractive index of the second rod lens varying so as to focus each of said planar light beams to a spherical light beam focused at the corresponding receiver.

15. An interconnection device as claimed in claim 11, wherein the input means and the output means comprise first and second hemispherical bodies, respectively, each of the bodies having a planar surface and a hemispherical surface, the first and second volume diffraction grating means being sandwiched between the respective planar surfaces of the hemispherical bodies, the first volume diffraction grating means being juxtaposed to the planar surface of the first hemispherical body and the second volume diffraction grating means being juxtaposed to the planar surface of the second hemispherical body, a mean refractive index of each volume diffraction grating means and respective refractive indexes of the hemispherical bodies being the same, the sources comprising optical waveguides disposed about the hemispherical surface of the first hemispherical body and the receivers comprising optical waveguides disposed about the hemispherical surface of the second hemispherical body, each optical waveguide having a tapered end portion diverging towards its end abutting the corresponding hemispherical body.

16. An optical interconnection device comprising Bragg diffraction means comprising at least one volume diffraction grating having a spatially varying refractive index, input means for directing input light beams onto said diffraction means, each input light beam resulting in a zero order light beam and a first order light beam leaving the Bragg diffraction means, and output means for receiving the zero order light beams and first order light beams leaving said Bragg diffracting means, the input means comprising first lens means for collimating spherical light beams before incidence upon the Bragg diffraction means and the output means comprising second lens means for converting planar output light beams to spherical light beams, wherein said input lens means comprises a first graded-index rod lens having one end juxtaposed to the Bragg diffraction means and said sources arrayed at its other end, the refractive index of the first rod lens varying radially so as to collimate spherical light beams, and the output lens means comprises a second graded-index rod lens having one end juxtaposed to the Bragg diffraction means and said receivers arrayed at its other end, the refractive index of the second rod lens varying radially to convert planar light beams leaving the Bragg diffraction means to spherical light beams.

17. An optical interconnection device comprising Bragg diffraction means comprising at least one volume diffraction grating means having a spatially varying refractive index, input means comprising a plurality of sources for directing input light beams onto said volume diffraction grating means, each input light beam resulting in a zero order light beam and a first order light beam leaving the volume diffraction grating means, and output means for receiving the zero order light beams and first order light beams leaving said volume diffraction grating means, the input means comprising first lens means for collimating spherical light beams each diverging from a corresponding one of a plurality of sources before incidence upon the volume diffraction grating means and the output means comprising second lens means for converting planar output light beams to spherical light beams, each converging to one of a plurality of receivers, wherein each of said first lens means and said second lens means comprises a hemispherical body, each of the hemispherical bodies having a planar surface and a hemispherical surface the diffraction means being sandwiched between the respective planar surfaces of the hemispherical bodies, a mean refractive index of the volume diffraction grating means and respective refractive indexes of the hemispherical bodies being the same, the plurality of sources comprising a plurality of waveguides disposed about the hemispherical surface of the input hemispherical body and the plurality of receivers comprising a plurality of waveguides disposed about the hemispherical surface of the output hemispherical body, each optical waveguide comprising a tapered end portion diverging towards its end abutting the corresponding hemispherical body.

18. An optical interconnection device comprising at least first and second volume diffraction grating means for diffracting at least one input light beam into zero order and first order light beams, said at least first and second volume diffraction grating means disposed between input means for directing a plurality of input light beams onto said first volume diffraction grating means and output means for receiving at least some of said zero order and first order light beams, the first and second volume diffraction grating means each having one or more grating patterns, the one or more grating patterns of the second volume diffraction grating means having respective grating vectors oriented perpendicularly to respective grating vectors of the one or more grating patterns of the first volume diffraction grating means;

the input means being arranged to direct a first plurality of collimated input light beams from a first plurality of sources, respectively, to the first volume diffraction means with respective axes of the first plurality of collimated input light beams in a first plane and to direct a second plurality of collimated input light beams from a second plurality of sources, respectively, to the first volume diffraction means with respective axes of the second plurality of collimated input light beams in a second plane, the first and second plane not being coplanar, and the output means comprising a plurality of receivers, each for receiving a corresponding one of a plurality of output light beams from the second volume diffraction grating means;

the first plurality of collimated input light beams comprising at least a first pair of collimated input light beams incident upon the first volume diffraction grating means according to Bragg conditions with respect to a corresponding grating pattern of the first volume diffraction grating means so that a zero order beam from one of the first pair of collimated input light beams and a first order light beam from the other of the first pair of collimated input light beams are coincident and form a first intermediate beam, and a zero order beam from said other of the first pair of collimated input light beams and a first order beam from said one of the first pair of collimated input light beams are coincident and form a second intermediate beam; the second plurality of collimated input light beams comprising at least a second pair of collimated input light beams also incident upon the first volume diffraction grating means according to Bragg conditions with respect to said corresponding grating pattern such that a zero order beam from one of the second pair of collimated input light beams and a first order beam from the other of said second pair of collimated input light beams are coincident and form a third intermediate beam and a zero order beam from said other of the second pair of collimated input light beams and a first order beam from said one of the second pair of collimated input light beams are coincident and form a fourth intermediate beam;

the second volume diffraction grating means being arranged to receive the four intermediate beams from the first volume diffraction grating means, the first intermediate beam and the third intermediate beam being incident upon the second volume diffraction grating means according to Bragg conditions with respect to a corresponding grating pattern of the second volume diffraction grating means such that a zero order beam from the first intermediate beam and a first order beam from the third intermediate beam are coincident and form a first output beam, and a zero order beam from the third intermediate beam and a first order beam from the first intermediate beam are coincident and form a second output beam, the second intermediate beam and the fourth intermediate beam being incident upon the second volume diffraction grating means according to Bragg conditions with respect to said corresponding grating pattern of the second volume diffraction grating means, but in a direction inclined relative to that in which the first and third intermediate beams are incident, such that a zero order beam from the second intermediate beam and a first order beam from the fourth intermediate beam are coincident and form a third output beam, and a zero order beam from the fourth intermediate beam and a first order beam from the second intermediate beam are coincident and form a fourth output beam.

19. An optical interconnection device as claimed in claim 18, wherein the first volume diffraction grating means comprises a plurality of grating patterns with their respective grating vectors extending parallel to said first plane but each inclined at a different angle, said first plurality of collimated input light beams includes a plurality of pairs of collimated input light beams, the number of such pairs being equal to the number of grating patterns in the first volume diffraction grating means, each of said pairs of collimated input light beams being incident upon the first volume diffraction grating means according to Bragg conditions with respect to a corresponding one of the plurality of grating patterns in the first volume diffraction grating means, resulting in a first plurality of intermediate beams each comprising a zero order from one of a said pair of collimated input light beams and a first order beam from the other of that pair of collimated input light beams, said second plurality of collimated input light beams includes a plurality of pairs of collimated input light beams, the number of pairs corresponding to the number of grating patterns in the first volume diffraction grating means, each of said pairs of collimated input light beams of the second plurality being incident upon the first volume diffraction grating means according to Bragg conditions with respect to a corresponding one of the plurality of grating patterns in the first volume diffraction grating means, resulting in a second plurality of intermediate beams each comprising a zero order from one of a said pair of collimated input light beams of the second plurality of collimated input light beams and a first order beam from the other of that pair of collimated input light beams, the second volume diffraction grating means comprising a plurality of grating patterns, the intermediate light beams comprising several pairs each comprising one of the first plurality of intermediate light beams and one of the second plurality of intermediate light beams, the number of pairs of intermediate light beams corresponding to the number of gratings in the second volume diffraction grating means, the light beams in each pair of intermediate light beams being incident upon the second volume diffraction grating means according to Bragg conditions with respect to a corresponding one of the plurality of gratings in the second volume diffraction grating means so that a zero order beam from a first intermediate light beam of the pair is coincident with a first order light beam from the other intermediate light beam of the pair, the arrangement being such that each output beam comprises a zero order beam from one of the sources and a first order beam from each of the other sources.

20. An interconnection device as claimed in claim 18, wherein the sources are configured for emitting divergent spherical said input light beams and the receivers are configured for receiving convergent spherical said output light beams, said input means comprising input lens means for collimating spherical light beams before incidence upon said first volume diffraction grating means, and said output means comprising output lens means for converting planar output light beams leaving said second volume diffraction grating means into spherical output light beams.

21. An interconnection device as claimed in claim 20, wherein said input lens means comprises a converging lens means and the sources are arranged in a spheric array that is concentric with a geometric center of said converging lens and has a radius of curvature equal to the focal length of said converging lens means, said sources being aligned for emitting said input light beams towards said geometric center.

22. An interconnection device as claimed in claim 20, wherein each said lens means comprises a one-quarter pitch graded-index rod lens, the input rod lens having one end juxtaposed to said first volume diffraction grating means and said sources arrayed at its other end and its refractive index varying such that light beams from the sources are each collimated on leaving said one end, and the output rod lens having one end juxtaposed to said second volume diffraction grating means and the receivers arrayed at its other end with its refractive index varying so as to focus collimated light beams from said second volume diffraction grating means to their respective receivers.

23. An interconnection device as claimed in claim 20, wherein said sources and said receivers are arranged to emit and receive, respectively, light beams offset from the optical axis of the lens means, and the refractive index of the input lens means varies such that the light beams are incident upon said first volume diffraction grating means from different directions, and the refractive index of the output lens means varies such that light beams leaving said second volume diffraction grating means are parallel to said optical axis when incident upon the receivers.

* * * * *